US012429443B2

(12) United States Patent
Schlytter-Henrichsen

(10) Patent No.: US 12,429,443 B2
(45) Date of Patent: Sep. 30, 2025

(54) METHOD OF TESTING THE THERMAL PERFORMANCE OF AN OBJECT

(71) Applicant: Favuseal AS, Rud (NO)

(72) Inventor: Christian Schlytter-Henrichsen, Borgen (NO)

(73) Assignee: Favuseal AS, Rud (NO)

( * ) Notice: Subject to any disclaimer, the term of this patent is extended or adjusted under 35 U.S.C. 154(b) by 164 days.

(21) Appl. No.: 18/554,896

(22) PCT Filed: Apr. 8, 2022

(86) PCT No.: PCT/EP2022/059464
§ 371 (c)(1),
(2) Date: Oct. 11, 2023

(87) PCT Pub. No.: WO2022/218864
PCT Pub. Date: Oct. 20, 2022

(65) Prior Publication Data
US 2024/0183807 A1 Jun. 6, 2024

(30) Foreign Application Priority Data
Apr. 16, 2021 (EP) ..................................... 21168931

(51) Int. Cl.
*G01N 25/18* (2006.01)
(52) U.S. Cl.
CPC ................... *G01N 25/18* (2013.01)
(58) Field of Classification Search
CPC ......... G01N 25/18; G01N 27/18; G01K 1/022
See application file for complete search history.

(56) References Cited

U.S. PATENT DOCUMENTS

| 2009/0016706 A1* | 1/2009 | Hayashida | ........ H01L 21/67109 |
| | | | 392/416 |
| 2015/0208549 A1* | 7/2015 | Shedd | ................... F25B 23/006 |
| | | | 165/104.27 |

(Continued)

FOREIGN PATENT DOCUMENTS

| CN | 204228635 U | 3/2015 |
| KR | 101478147 B1 | 1/2015 |

OTHER PUBLICATIONS

Barnett C.R. "BFD curve: a new empirical model for fire compartment temperatures" Fire Safety Journal, 2002, pp. 437-463, vol. 37.

(Continued)

*Primary Examiner* — Lee E Rodak
*Assistant Examiner* — Zannatul Ferdous
(74) *Attorney, Agent, or Firm* — Knobbe, Martens, Olson & Bear, LLP

(57) ABSTRACT

The invention relates to the testing of the thermal performance of at least one object (6), such as an electric cable. First, at least one initial temperature curve is obtained by subjecting at least one first enclosure (1) having side walls lined with thermally insulating material to a predetermined test curve inside a first furnace (3) while monitoring the temperature inside each of the at least one first enclosure. The at least one initial temperature curve is stored in a database (5). Then, the at least one object is placed inside a second furnace (7) which is heated in accordance with one of the at least one initial temperature curve while determining a resulting test parameter for each of the at least one object, the test parameter being an indicator of the thermal performance. The method can e.g. be used in a process of selecting the necessary amount and type of thermally insulating material for a given application of the object.

14 Claims, 3 Drawing Sheets

(a)

(b)

(56) References Cited

U.S. PATENT DOCUMENTS

2016/0120065 A1\* 4/2016 Shedd .................... F28F 9/26
                                                                                             165/104.29
2018/0228060 A1\* 8/2018 Alissa ................ H05K 7/20745

OTHER PUBLICATIONS

Cooper, Leonard Y. et al., "NISTIR 5842—Methodology for Developing and Implementing Alternative Temperature-Time Curves for Testing the Fire Resistance of Barriers for Nuclear Power Plant Applications" Building and Fire Research Laboratory—National Institute of Standards and Technology, May 1996.

Jiang, Feng et al., "Experimental Study on Delaying the Failure Time of In-Service Cables in Trays by Using Fire-Retardant Coatings" Applied Sciences, 2021, pp. 1-19, vol. 11, No. 2521.

European Search Report for EP 21168931 dated Sep. 28, 2021.

International Search Report for PCT/EP2022/059464 dated Jul. 25, 2022.

\* cited by examiner

METHOD OF TESTING THE THERMAL PERFORMANCE OF AN OBJECT

CROSS REFERENCE TO RELATED APPLICATIONS

This application is a U.S. National Phase Application of PCT International Application Number PCT/EP2022/059464, filed on Apr. 8, 2022, designating the United States of America and published in the English language, which is an International Application of and claims the benefit of priority to European Patent Application No. 21168931.0, filed on Apr. 16, 2021. The disclosures of the above-referenced applications are hereby expressly incorporated by reference in their entireties.

FIELD OF THE INVENTION

The present invention relates to a method of testing the thermal performance of an object. In particular, it relates to a two-step method in which the first step includes obtaining at least one initial temperature curve, and the second step includes testing the thermal performance of the object by exposing it to a heating process in accordance with the at least one initial temperature curve obtained in the first step.

BACKGROUND OF THE INVENTION

The present invention has been developed in relation to the technical field of fire protection of electric cables to be used within the oil and gas industry, such as on-board large floating production facilities or storage and off-loading ships (FPSO). For such uses, the electric cables are typically arranged in cable trays protected by surrounding fireboxes having the side walls lined with thermally insulating material in order to protect the cables against the high temperatures arising during a possible fire. The actual cables to be chosen for a specific project need to undergo very expensive fire testing at a fire lab in order to test, if they are compliant to the relevant specifications. No currently known cables can withstand a possible fire on a stand-alone basis, so a passive fire protection needs to be applied, typically in the form of a firebox arranged around the cable tray with the specified cables inside, or as a fire jacket or intumescent paint installed on the cables. After the application of the fire protection, the fire testing is performed, and due to the high cost of such high temperature tests, this leads to very high project specific costs in order to validate the functionality of the cables.

When the next FPSO or any other installation is to be built, a different set of cables is typically used, so once again, the project incurs the same fire testing cost in order to validate the functionality of those cables, since the cables are different, or the relevant fire scenario or time to failure is different. Therefore, each project incurs very high project specific fire testing costs.

Similar considerations apply to other elements that are to withstand high temperature conditions, such as high temperature resistant material to be used for pipes, buildings, vehicles or airplanes. Hence, an improved method of testing the thermal performance of an object would be advantageous.

OBJECT OF THE INVENTION

It is an object of the present invention to provide a method of testing the thermal performance of an object which is more efficient than known methods.

It is another object of the present invention to provide a method of testing the thermal performance of an object with which the need for repeatedly performing expensive high temperature tests can avoided.

It is an object of at least some embodiments of the present invention to provide a method with which the thermal performance of a plurality of objects can be tested simultaneously.

It is another object of at least some embodiments of the present invention to provide an efficient method of performing quality control of the thermal performance of new products being considered in replacement of known products.

It is a further object of the present invention to provide an alternative to the prior art.

In particular, it may be seen as an object of the present invention to provide a method of testing the thermal performance of an object that solves the above mentioned problems of the prior art.

SUMMARY OF THE INVENTION

The above described object and several other objects are intended to be obtained in a first aspect of the invention by providing a method of testing the thermal performance of at least one object, the method comprising the steps of:
  providing at least one initial temperature curve which has been obtained by:
    providing at least one first enclosure having side walls lined with thermally insulating material,
    arranging a temperature sensor configured to monitor the temperature inside each of the at least one first enclosure,
    arranging the at least one first enclosure inside a first furnace,
    increasing the temperature of the first furnace in accordance with a predetermined test curve while monitoring the temperature inside the at least one first enclosure and thereby obtaining an initial temperature curve for each of the at least one first enclosure, and
    storing the at least one initial temperature curve in a database for later use,
    possibly repeating the above steps if more initial temperature curves are needed for the subsequent steps,
  placing the at least one object inside a second furnace for testing of the thermal performance of the at least one object,
  heating the second furnace in accordance with one of the at least one initial temperature curve while determining a resulting test parameter for each of the at least one object, the test parameter being an indicator of the thermal performance.

As mentioned above, the invention has been developed within the technical field of electrical cables. However, the method can be useful for any kind of object that requires fire protection. It could e.g. be a steel pipe or a part of a construction.

The predetermined test curve used when obtaining the at least one initial temperature curve is typically high temperature test conditions determined by different fire scenario standards; see further details below. Since the temperature condition which the object being tested is exposed to in the second furnace has been obtained inside a thermally insulated enclosure, the temperature of the second furnace will typically be significantly lower than the one used during the obtaining of the at least one initial temperature curve.

As will be described in further details in the following, an idea of the present invention is that the stored at least one initial temperature curve can be used repeatedly so that the testing of actual objects can be done without the need for repeatedly performing expensive high temperature tests.

A method of testing the thermal performance of at least one object can be considered as a two-step method where the first step includes the use of a first furnace and the second step includes the use of a second furnace. In some embodiments of the invention, both steps are performed by the same party whereas in other embodiments, the first and second steps are performed by two different parties, the first providing the at least one initial test curve to be used by the other party in the second step.

In some embodiments of the invention, the method further comprises the steps of obtaining the at least one initial temperature curve.

In such embodiments, the invention could alternatively be described as a method of testing the thermal performance of at least one object, the method comprising the steps of:
obtaining at least one initial temperature curve by:
providing at least one first enclosure having side walls lined with thermally insulating material,
arranging a temperature sensor configured to monitor the temperature inside each of the at least one first enclosure,
arranging the at least one first enclosure inside a first furnace,
increasing the temperature of the first furnace in accordance with a predetermined test curve while monitoring the temperature inside the at least one first enclosure and thereby obtaining an initial temperature curve for each of the at least one first enclosure, and
storing the at least one initial temperature curve in a database for later use,
possibly repeating the above steps if more initial temperature curves are needed for the subsequent steps,
subsequently to the step of obtaining the at least one initial temperature curve, placing the at least one object inside a second furnace for testing of the thermal performance of the at least one object,
heating the second furnace in accordance with one of the at least one initial temperature curve while determining a resulting test parameter for each of the at least one object, the test parameter being an indicator of the thermal performance.

By "arranging a temperature sensor configured to monitor the temperature inside each of the at least one first enclosure" is meant that at least the part of the temperature sensor necessary for the measurement is arranged as described. Some parts, such as e.g. a shaft or an extension of a wire, may extend to outside the first enclosure.

As mentioned above, the present invention has been developed in relation to the technical field of fire protection of electric cables to be used within the oil and gas industry, such as on-board large floating production facilities or storage and off-loading ships. For such uses, the electric cables are typically arranged in cable trays protected by surrounding fireboxes having the side walls lined with thermally insulating material in order to protect the cables against the high temperatures arising during a possible fire. By "firebox" is meant a protective shielding arranged around parts, such as cables, to be protected against exposure to high temperatures. Even though the below detailed description will be focused on this application, the invention may also be used for the testing of other objects for which it is necessary to know the thermal performance.

A method according to the present invention can be considered as a two-step method, namely having a first step in which the at least one initial temperature curve is obtained and a second step in which this at least one initial temperature curve is used for the testing of the object. The first step typically involves the preparation of a plurality, such as a large number, of initial temperature curves and storing them in a database.

A predetermined test curve used in this first step typically corresponds to a high temperature condition that the object being tested has to be able to withstand during a later real use of the same or a similar object. It will e.g. be a fire scenario which within the field of fire testing is often referred to as e.g. HC pool fire, jet fire, or high heat flux jet fire. Typically, a plurality of initial temperature curves are prepared by using different configurations of thermally insulating material, such as having different thickness and/or type of the thermally insulating material. Different thicknesses may e.g. be obtained by using different number of layers of a given material. For each configuration, the initial temperature curves may be obtained for different predetermined test curves so that a large compilation of different combinations is obtained and stored for later use. These test curves could be based on the required international or national standards to be met for a given application, such as within the oil and gas industry. Such high temperature tests require special equipment and are very expensive to perform. Thus, an advantage of the invention is that when these initial temperature curves have been obtained, they can be used in the second step of the method as many times as wanted, including at other locations than where the initial temperature curves were obtained.

The second step of the method involves subjecting the object to be tested to the initial temperature curves measured at a position surrounded by the thermally insulating material, i.e. at significantly lower temperatures than those to which the first furnace was heated. Therefore, the measurements being performed in the second furnace, i.e. the second step, can typically be done at so low temperatures that a traditional furnace can be used. Thus, these measurements on the object are significantly cheaper and can with less cost be repeated until a satisfactory combination of object and fire protection material for a given fire scenario has been found. More examples of the testing will be given in the following and in relation to the figures.

A further advantage of performing the measurements in the first furnace without the objects being present is that this results in the initial temperature curves representing a worst-case scenario, since during later use under similar conditions, a part of the heat would be spent on heating-up the object. Therefore, if the object can withstand a temperature increase corresponding to an initial temperature curve, it can also withstand the actual and slightly lower or slower temperature increase after installation. The method therefore has a build-in safety margin making it safe to base a design process on the results obtained.

In some embodiments of the invention, a plurality of first enclosures lined with different thickness and/or type of thermally insulating material are arranged inside the first furnace at the same time. Hereby the determination of the initial temperature curves can be made more efficient.

The method may further comprise, before the step of increasing the temperature of the first furnace, arranging a second enclosure inside each of the at least one first enclosure, the second enclosure having the corresponding temperature sensor arranged inside the second enclosure so that during the step of increasing the temperature of the first furnace in accordance with the predetermined test curve, the temperature inside the second enclosure is monitored whereby the initial temperature curve for each of the at least one first enclosure is obtained. By "the corresponding temperature sensor" is meant the one mentioned above as arranged inside the first enclosure. Such a second enclosure may e.g. be in the form on an empty cable tray resembling those to be used for mounting of cables e.g. on a ship. Hereby the test can simulate the real use of a cable being tested, since some of the heat will be consumed by the heating of the cable tray. By using cable trays, it may also be easier to arrange the temperature sensor in an appropriate manner, e.g. without direct contact with the thermally insulating material.

During the performance of the method as described above, a plurality of objects may be placed in the second furnace at the same time so that their respective thermal performances are tested simultaneously. Hereby a time and cost efficient testing can be ensured.

The determination of the resulting test parameter for each of the at least one object may be performed by monitoring the test parameter as a function of time. This may e.g. be used as guidance for which further tests to perform in case an actual test does not lead to a satisfactory result. It may also be used to substantiate the test results to get more information than just "failed" or "passed" for a given test.

In some embodiments of the invention, the database in which the at least one initial temperature curve is stored can be accessed directly by a control unit of the second furnace. This access may e.g. be wirelessly or it may be by having the database stored on a transportable medium, such as a USB stick.

In some embodiments of the invention, the object is or comprises electrically conductive material, and the test parameter is the electrical resistivity thereof.

In general, which parameter to choose as test parameter will e.g. depend on the type of object being tested and on what is used as a criteria on which the determination about the necessary fire protection is based.

As mentioned above, the at least one object may be at least one electrical cable. In that case, the test parameter will typically be the electrical resistivity, since a change thereof has been found to be a good measure of any possible negative influence from exposure to a too high temperature. An example of how the electrical resistivity can be monitored during the heating in the second furnace will be given in relation to the figures.

The first furnace may be heated in accordance with a predetermined test curve including heating to a temperature of at least 800 degrees Celsius, such as at least 1000 degrees Celsius. Different examples of test curves will be shown in the figures.

In any of the embodiments as described above, the method may further comprise a step of preparing a certification of at least one tested combination of object and first enclosure having side walls lined with thermally insulating material, the certification comprising validation that a predetermined thermal performance is ensured. Hereby the method can be used to obtain not only the required correct product for a given application but also the necessary documentation therefore.

In a second aspect, the invention relates to the use of a method as in any of the embodiments described above in a process of selecting the necessary amount and type of thermally insulating material for a given application of the object. Or in other words, the use during a development process.

Alternatively, the second aspect of the invention relates to the use of a method as in any of the embodiments described above for quality testing of objects to be used under predetermined conditions corresponding to at least one tested first enclosure lined with thermally insulating material and the corresponding at least one initial temperature curve. This will be a way of testing whether an object fulfils given requirements, e.g. when an alternative supplier of a product, such as an electric cable, offers to provide a cheaper solution. In that case, the invention provides for an efficient way of checking whether or not it is safe to change supplier.

The first and second aspects of the present invention may be combined. These and other aspects of the invention will be apparent from and elucidated with reference to the embodiments described hereinafter.

BRIEF DESCRIPTION OF THE FIGURES

The method of testing the thermal performance of an object according to the invention will now be described in more detail with regard to the accompanying figures. The figures show one way of implementing the present invention and is not to be construed as being limiting to other possible embodiments falling within the scope of the attached claim set.

FIGS. 1.a and 1.b show the first enclosure without and with the additional use of a cable tray, respectively.

DETAILED DESCRIPTION OF AN EMBODIMENT

The following description of the invention will be based on the technical application for which it was developed, namely for the testing of electrical cables and the necessary fire protection thereof by use of surrounding fireboxes lined with thermally insulating material. However, as mentioned above, the scope of protection also covers other applications.

As explained, a method of testing the thermal performance of at least one object, in the following referred to as an electrical cable, is a two-step method. In some embodiments of the invention, both steps are performed by the same party whereas in other embodiments, the first and second steps are performed by two different parties, the first providing the at least one initial test curve to be used by the other party in the second step. FIGS. 1-4 describe the first step of obtaining at least one initial temperature curve and storing it in a database for later use.

Figure 1:
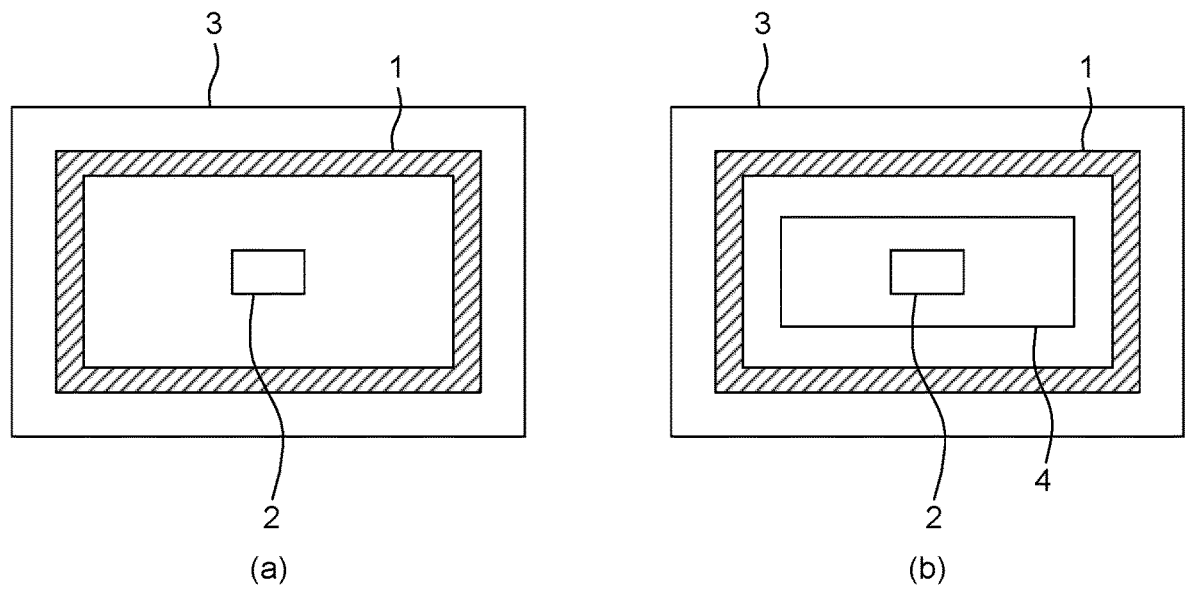
FIG. 1 schematically shows a first enclosure lined with thermally insulating material and arranged in a first furnace.

First, at least one first enclosure 1 having side walls lined with thermally insulating material is prepared as shown schematically as one first enclosure 1 in FIG. 1.a. With reference to testing of electrical cables, this first enclosure 1 will typically be a firebox. The thermally insulating material can be any type of material under consideration for a given application. It will typically be chosen as part of the design process for a given installation, such as chosen by a supplier of the material and/or of the electrical cables. An example of a type of thermally insulating material that has been used during the development of the present invention is known under the tradename Favuseal®. A temperature sensor 2 configured to monitor the temperature inside the first enclosure 1 is arranged therein. The temperature signal obtained by the temperature sensor can be sent to a data collector (not shown), such as a computer, in any known manner, such as via an electric wire or wirelessly. As shown in FIG. 1.*a*, the first enclosure 1 is arranged inside a first furnace 3. FIG. 1.*b* shows an alternative test set-up in which a second enclosure 4 in the form of an empty cable tray is arranged inside the first enclosure 1. The second enclosure 4 has the corresponding temperature sensor 2 arranged inside it. In these figures, the first and second enclosures 1,4 are shown as being box-shaped and with closed ends. However, other shapes are also possible; see FIG. 3 for a further example.

Figure 2:
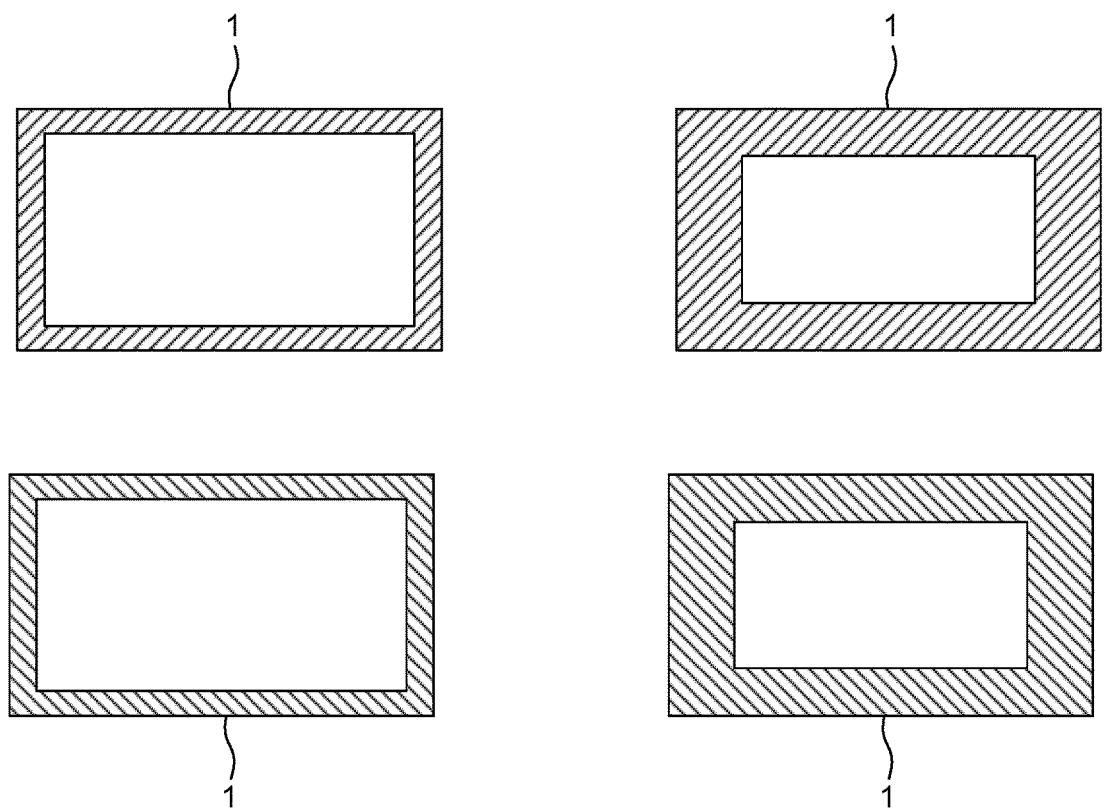
FIG. 2 schematically shows examples of first enclosures provided with different configurations of thermally insulating material.
Figure 3:
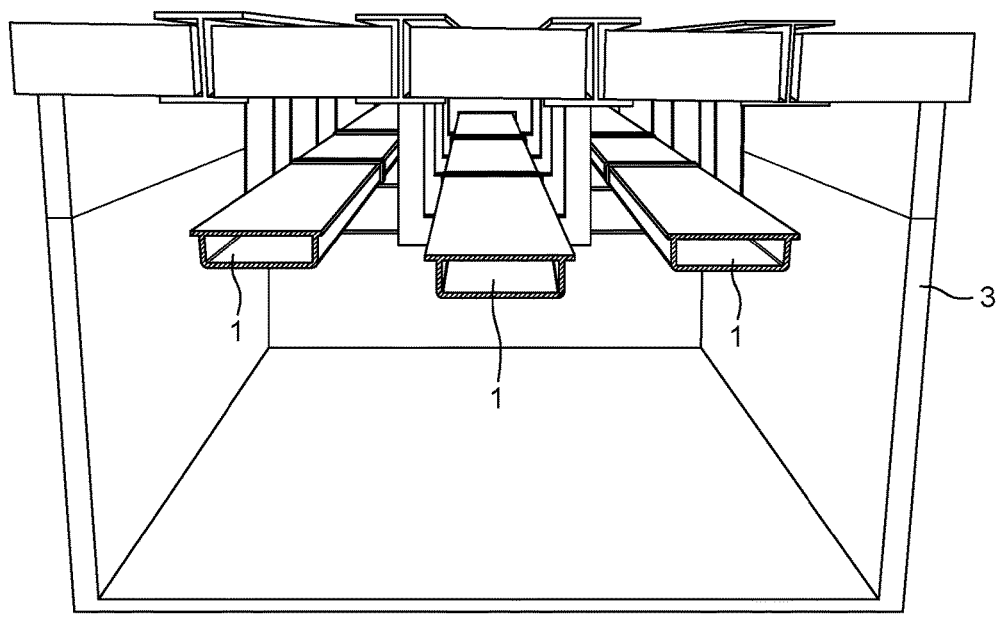
FIG. 3 schematically shows an example of how three first enclosures can be arranged simultaneously in a first furnace.

For most applications, a large number of initial temperature curves are obtained and stored in a database for later use. Therefore, to make this process as efficient as possible, a plurality of first enclosures 1 lined with different thickness and/or type of thermally insulating material are typically arranged inside the first furnace 3 at the same time. FIG. 2 schematically shows an example of such different configurations in the form of two different types of materials each tested in different thicknesses. FIG. 3 schematically shows an example of three first enclosures 1 arranged inside the first furnace 3. In this example, they are suspended from the ceiling of the furnace, but any suitable arrangement can be used.

Figure 4:
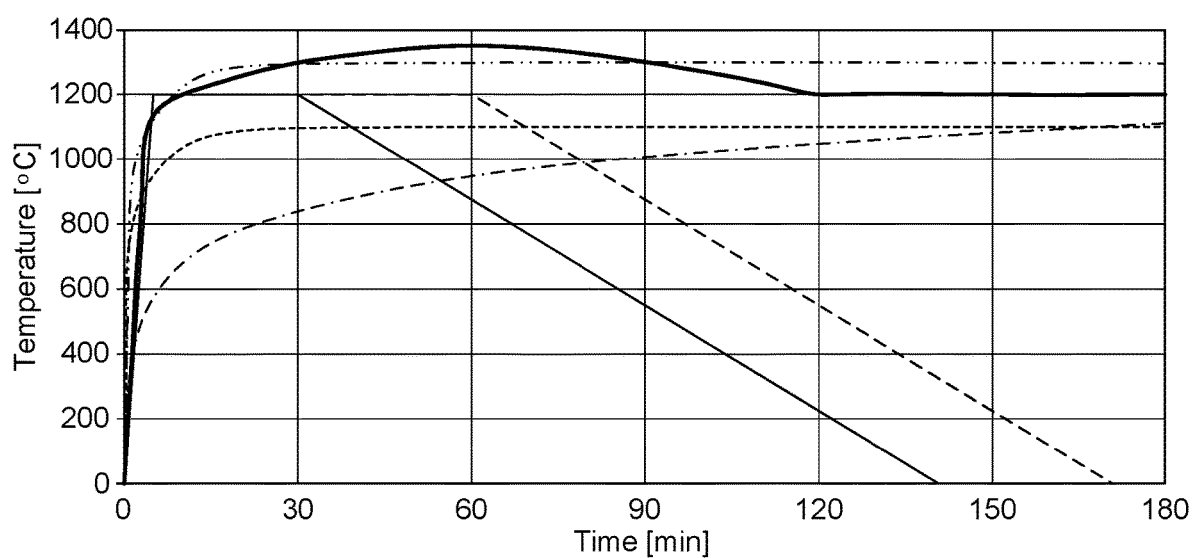
FIG. 4 shows examples of different predetermined test curves to be used for the heating of the first furnace.
Figure 5:
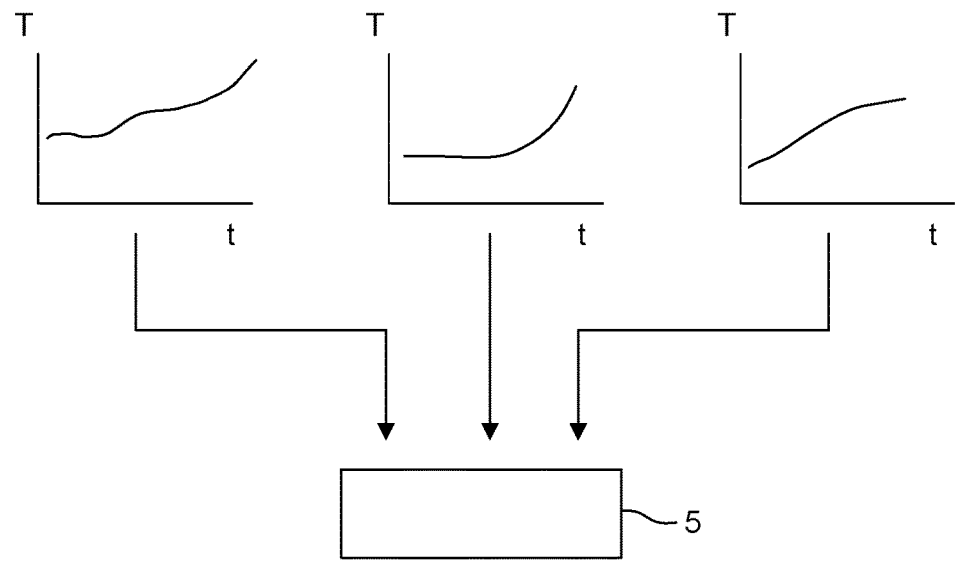
FIG. 5 schematically shows how a plurality of initial temperature curves are stored in a database for later use.

The temperature of the first furnace 3 is then increased in accordance with a predetermined test curve while monitoring the temperature inside the at least one first enclosure 1. This typically includes heating to a temperature of at least 800 degrees Celsius, such as at least 1000 degrees Celsius. FIG. 4 shows examples of such test curves used to simulate different types of fire scenarios. Each combination of applied heating process and configuration of first enclosure lined with the thermally insulating material results in an initial temperature curve. These initial temperature curves are stored in a database 5 for later use as shown schematically in FIG. 5. If more initial temperature curves are needed for the subsequent steps, the above steps are repeated. This could e.g. be relevant, if more fire scenarios are to be tested. In a similar manner, it will also be possible to add more initial temperature curves at a later point in time, e.g. after the development of new types of thermally insulating materials or if not yet tested fire scenarios become relevant.

Figure 6:
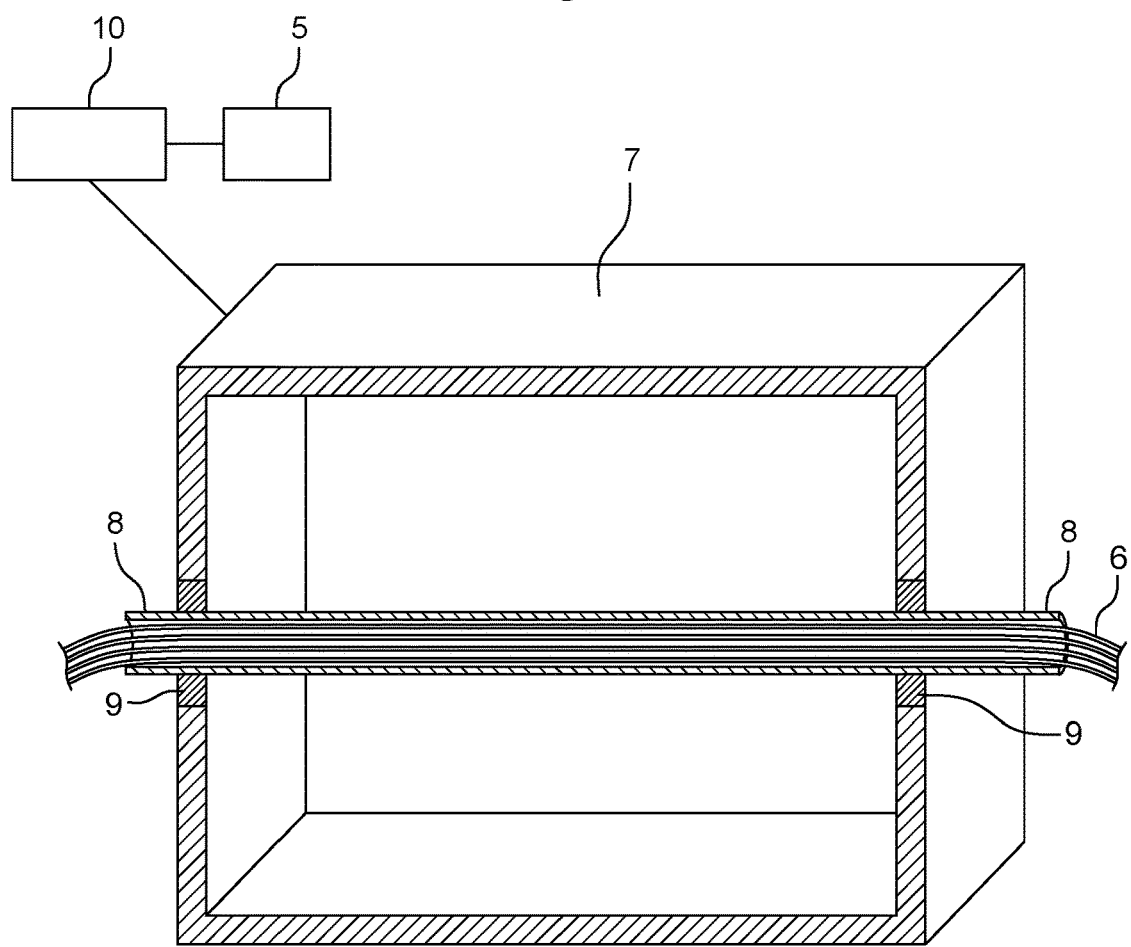
FIG. 6 schematically shows the step of testing the thermal performance of a plurality of electric cables in a second furnace.

When the required number of initial temperature curves have been obtained, they can be used in the second step of the method in which the at least one object 6, here an electric cable, is arranged inside a second furnace 7 to be used for the testing of the thermal performance of the at least one object 6. This is shown schematically and in cross-sectional view in FIG. 6 in which a plurality of electric cables 6 are shown as being tested simultaneously. The cables are in this embodiment arranged in a cable tray 8 extending through the second furnace 7. At the points where the cable tray 8 passes the walls of the second furnace 7, it is typically provided with thermal insulation 9.

The second furnace 7 is heated in accordance with one of the initial temperature curves at a time while determining a resulting test parameter for each of the electric cables 6. The test parameter is an indicator of the thermal performance of the electric cable 6. The temperature of the second furnace 7 is typically controlled by a control unit 10 having direct access to the database 5 in which the initial temperature curves are stored. For electrical cables, the test parameter can e.g. be the electrical resistivity which can be measured continuously or at specified intervals by use of any appropriate type of instrument, such as a megger. How to evaluate the test results will depend on the actual application, and it is therefore not shown in the figure. The evaluation can e.g. include monitoring that the test parameter used does fall below a predetermined threshold value during the course of the test.

A method as described above may e.g. be used in a process of selecting the necessary amount and type of thermally insulating material for a given application of the object. In that case, the method may comprise a step of preparing a certification of at least one tested combination of object and first enclosure having side walls lined with thermally insulating material, the certification comprising validation that a predetermined thermal performance is met. For some applications, it will be sufficient to have one combination certified whereas for others it will be advantageous to certify a range of combinations.

A method as described above may also be used for quality testing of objects to be used under predetermined conditions corresponding to at least one tested first enclosure lined with thermally insulating material and the corresponding at least one initial temperature curve. This will e.g. be relevant in a situation where an offer is obtained from an alternative supplier than the one previously used. For some types of objects, it can be difficult to see directly from the product whether or not a given performance is met, but this can easily be tested with a method according to the present invention without having to repeat the expensive high temperature measurements in a first furnace.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Furthermore, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of testing the thermal performance of at least one object, the method comprising:
    providing at least one initial temperature curve, which has been obtained by:
        providing at least one first enclosure having side walls lined with thermally insulating material,
        arranging a temperature sensor configured to monitor the temperature inside each of the at least one first enclosure,
        arranging the at least one first enclosure inside a first furnace,
        increasing the temperature of the first furnace in accordance with a predetermined test curve while monitoring the temperature inside the at least one first enclosure and thereby obtaining an initial temperature curve for each of the at least one first enclosure, the initial temperature curve for each of the at least one first enclosure having a lower maximum temperature than a maximum temperature of the predetermined test curve, and storing the at least one initial temperature curve in a database for later use, placing the at least one object inside a second furnace for testing of the thermal performance of the at least one object, providing the at least one initial temperature curve from the database to the second furnace, and heating the second furnace in accordance with one of the at least one initial temperature curve while determining a resulting test parameter for each of the at least one object, the test parameter being an indicator of the thermal performance.

2. The method according to claim 1, further comprising obtaining the at least one initial temperature curve.

3. The method according to claim 1, wherein a plurality of first enclosures lined with different thickness and/or type of thermally insulating material are arranged inside the first furnace at the same time.

4. The method according to claim 1, further comprising, before increasing the temperature of the first furnace, arranging a second enclosure inside each of the at least one first enclosure, the second enclosure having the corresponding temperature sensor arranged inside the second enclosure so that during the increasing of the temperature of the first furnace in accordance with the predetermined test curve, the temperature inside the second enclosure is monitored whereby the initial temperature curve for each of the at least one first enclosure is obtained.

5. The method according to claim 1, wherein a plurality of objects are placed in the second furnace at the same time so that their respective thermal performances are tested simultaneously.

6. The method according to claim 1, wherein the determination of the resulting test parameter for each of the at least one object is performed by monitoring the test parameter as a function of time.

7. The method according to claim 1, wherein the database in which the at least one initial temperature curve is stored can be accessed directly by a control unit of the second furnace.

8. The method according to claim 1, wherein the at least one object comprises electrically conductive material, and wherein the test parameter is the electrical resistivity thereof.

9. The method according to claim 1, wherein the at least one object is at least one electrical cable.

10. The method according to claim 1, wherein the first furnace is heated in accordance with a predetermined test curve including heating to a temperature of at least 800 degrees Celsius.

11. The method according to claim 1, further comprising preparing a certification of at least one tested combination of the at least one object and first enclosure having side walls lined with thermally insulating material, the certification comprising validation that a predetermined thermal performance is ensured.

12. The method according to claim 1, further comprising selecting the amount and type of thermally insulating material for a given application of the at least one object.

13. The method according to claim 1, further comprising quality testing of the at least one object under predetermined conditions corresponding to at least one tested first enclosure lined with thermally insulating material and the corresponding at least one initial temperature curve.

14. The method according to claim 1, further comprising:
providing at least one additional initial temperature curve, which has been obtained by:
providing the at least one first enclosure having side walls lined with thermally insulating material,
arranging the temperature sensor to monitor the temperature inside each of the at least one first enclosure,
arranging the at least one first enclosure inside the first furnace,
increasing the temperature of the first furnace in accordance with the predetermined test curve while monitoring the temperature inside the at least one first enclosure and thereby obtaining the at least one additional initial temperature curve for each of the at least one first enclosure, each additional initial temperature curve having a lower maximum temperature than a maximum temperature of the predetermined test curve, and
storing the at least one additional initial temperature curve in the database for later use.

* * * * *